United States Patent [19]
Keithley

[11] Patent Number: 6,028,677
[45] Date of Patent: Feb. 22, 2000

[54] METHOD AND APPARATUS FOR CONVERTING A GRAY LEVEL PIXEL IMAGE TO A BINARY LEVEL PIXEL IMAGE

[75] Inventor: Douglas G. Keithley, Boise, Id.

[73] Assignee: Hewlett-Packard Co., Palo Alto, Calif.

[21] Appl. No.: 08/932,813

[22] Filed: Sep. 16, 1997

[51] Int. Cl.[7] .......................... G06K 15/02; H04N 1/405
[52] U.S. Cl. ........................ 358/1.9; 382/237; 382/252; 382/270; 358/456; 358/466; 358/298
[58] Field of Search .................................. 358/457, 447, 358/465, 456, 458, 1.9, 466, 298; 382/252, 237, 270

[56] References Cited

U.S. PATENT DOCUMENTS

| | | | |
|---|---|---|---|
| 4,449,150 | 5/1984 | Kato | 358/283 |
| 5,201,013 | 4/1993 | Kumagai | 382/50 |
| 5,337,160 | 8/1994 | Jones | 358/447 |

OTHER PUBLICATIONS

"Digital Halftoning", Ulichney, R., MIT Press, 1987, pp. 63–65, 233, 239–243 and 265–271.

*Primary Examiner*—Scott Rogers

[57] ABSTRACT

A dither method converts multi-bit grey level pixel values into an image array of binary level pixel values, wherein the image array is arranged as a raster of scan lines. The method includes the following steps: (i) for each line of grey level pixels, deriving an error value for each grey level pixel of the scan line by finding a difference between a variable threshold value and a grey value of the pixel; (ii) combining the error value with a next-in-line grey level pixel value before deriving an error value therefor; (iii) assigning a first binary value to the pixel if the error value is less than the variable threshold or assigning a second binary value to the pixel if the error value is greater than the variable threshold value; and (iv) deriving the variable threshold values that are compared with grey level pixel values in the scan line, by generating a random value to control generation of the variable threshold value at each pixel site, the random value for each one of a plurality of contiguous scan line evidencing a different value.

14 Claims, 2 Drawing Sheets

METHOD AND APPARATUS FOR CONVERTING A GRAY LEVEL PIXEL IMAGE TO A BINARY LEVEL PIXEL IMAGE

FIELD OF THE INVENTION

This invention relates to systems for converting a grey level pixel image into a binary level pixel image and, more particularly, to a system and method for applying an improved dither procedure during conversion of the gray level pixel values to the binary level pixel values.

BACKGROUND OF THE INVENTION

Presently, raster scan printers are called upon to produce binary level pixel half-tone images from grey level pixel images. In a grey level pixel image, each pixel element fed from a processor includes a multi-bit value that defines the pixel's grey level. An 8-bit byte can define any of 0–255 grey levels. In converting such a grey level pixel image to a binary level pixel image, each pixel's grey level value is compared to a threshold and, if the grey level value exceeds or equals the threshold, it is assigned a first binary value (e.g. a 1). If its value is less than the threshold, it is assigned a complementary binary value (e.g. a 0). Such conversion accomplishes the creation of a binary half-tone image.

The quality of the image that is created suffers as a result of the conversion processing not taking into account error values that occur during the conversion process. An "error value" is the difference between the binary pixel value after conversion and the grey level value of the pixel before conversion.

To improve the quality of binary pixel images, Floyd et al. in "An Adaptive Algorithm Spatial Grey Scale", Proceedings of the Society for Information Display, Volume 17, No. 75 (1976), pp. 36–37, suggest that error values be diffused to adjacent pixels so as to provide smoother half-tone transitions. Floyd et al. allocate defined fractions of the error value to plural adjacent pixels on both a same scan line and on a next scan line, respectively. Such action requires that substantial amounts of memory be allocated for the storage of the scan line error values so that the allocation can be accomplished as a next scan line of pixel values is encountered.

Various techniques have been developed to reduce the memory accesses required to accomplish the Floyd et al. error diffusion procedure. For instance, see U.S. Pat. No. 5,337,160 to Jones, assigned to the same assignee as this application.

The above-described error-diffusion procedure, as well as many others, are referred to as dither procedures. The most simple dither procedure is where an 8-bit grey level value is compared to a fixed threshold value, as described above, and the output of the comparison action results in either a 1 or 0 being generated that causes either a dot to be printed or no dot to be printed. The use of a constant threshold works well with text and certain types of half-tone images, but does not work well with continuous tone image scans. A further type of dither, termed "ordered" dither, causes an 8-bit grey value to be compared to a number from a table of values that is based on a row and column position of the pixel in the image. The table values (i.e. threshold levels) is used to form a "super pixel" or larger dot that is periodically spaced on a page, with the size of the dot related to the grey scale value. Ordered dither works well with continuous tone data images, has some moire problems with half-tone images, and tends to make text scans look jagged.

A random dither derives threshold numbers from a random number generator, and employs such random numbers as threshold values at successive pixel positions. Such random dither is also known as white noise dither and results in a spattering of small dots on the page. The density of the dots is related to the grey level value of the grey level pixel values. White noise dither adds graininess to text, half-tone and continuous tone scans.

There is also a type of dither known as blue noise dither which combines a white noise thresholding -comparison operation at each pixel with a propagation of error values at each pixel position to adjoining pixels. Such a blue noise dither error diffusion procedure requires errors from at least one full scan line of grey level pixel data to be stored, pending receipt of a next full scan line of pixel data.

In a blue noise dither procedure, if error values are propagated only to the "right" of each individual pixel in a scan line (and not to pixels in a next scan line), that the resulting error values cause "streaks" in the image. This is due to the fact that the previous scan line does not convey to the subsequent scan line where the error lies therein. Accordingly, the next scan line can have similar error values which line up in the same places in the image, thus causing streaking. The benefit of propagating error values only to the right in a scan line is that only one pixel error value at a time needs be stored and memory requirements are greatly reduced. However, as aforesaid, the pixel image suffers significantly.

Accordingly, it is an object of this invention to employ an improved dither procedure wherein error value memory requirements are minimized.

It is another object of this invention to provide an improved method and apparatus for conversion of a grey level pixel image to a binary level pixel image, wherein an improved dither procedure is employed that avoids the imposition of patterns on the resulting image.

SUMMARY OF THE INVENTION

A dither method converts multi-bit grey level pixel values into an image array of binary level pixel values, wherein the image array is arranged as a raster of scan lines. The method includes the following steps: (I) for each line of grey level pixels, deriving an error value for each grey level pixel of the scan line by finding a difference between a variable threshold value and a grey value of the pixel; (ii) combining the error value with a next-in-line grey level pixel value before deriving an error value therefor; (iii) assigning a first binary value to the pixel if the error value is less than the variable threshold or assigning a second binary value to the pixel if the error value is greater than the variable threshold value; and (iv) deriving the variable threshold values that are compared with grey level pixel values in the scan line, by generating a random value to control generation of the variable threshold value at each pixel site, the random value for each one of a plurality of contiguous scan line evidencing a different value.

DETAILED DESCRIPTION OF THE INVENTION

Figure 1:
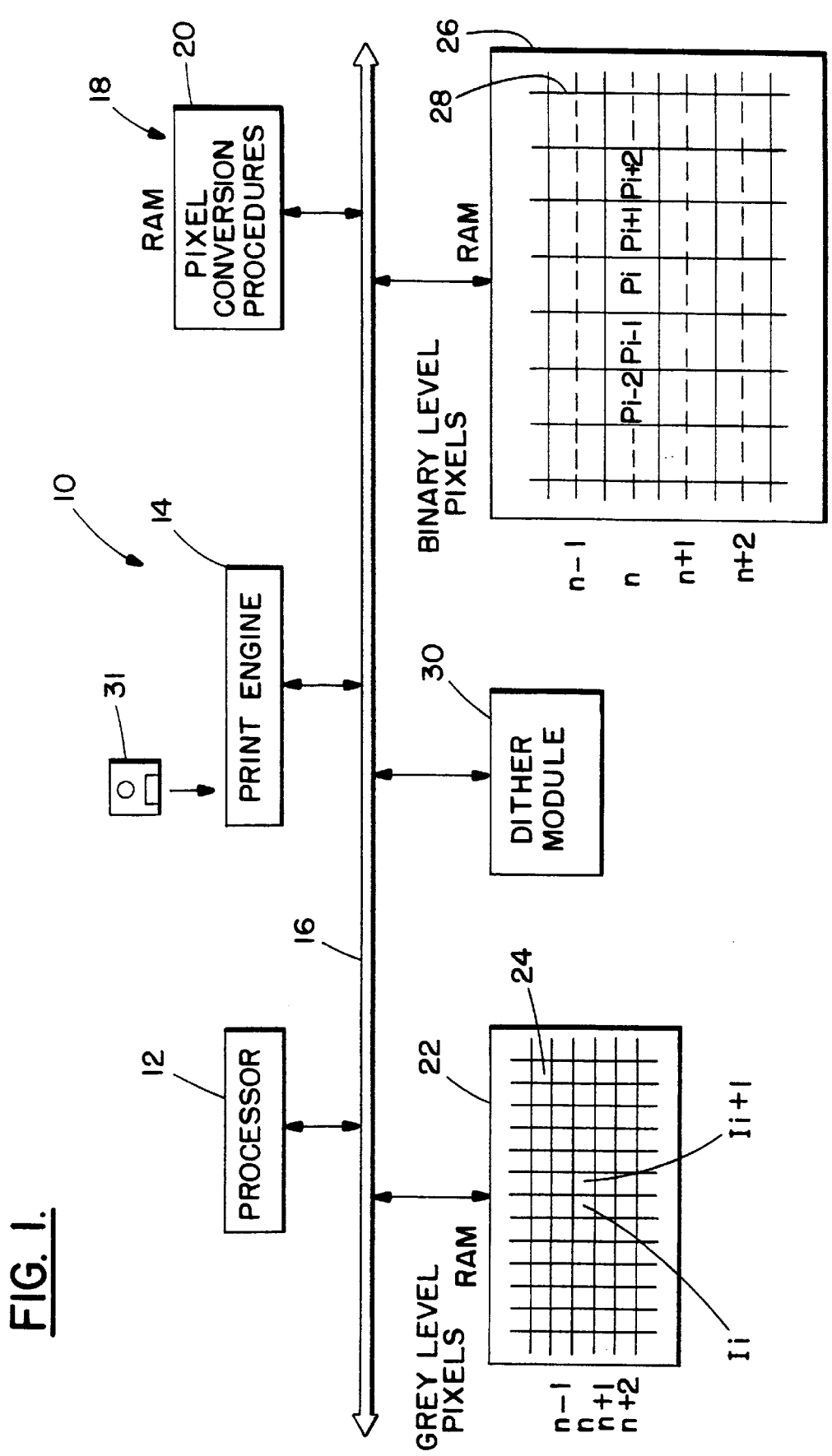
FIG. 1 is a high level block diagram of a printer adapted to perform the method of the invention.

Referring to FIG. 1, a printer 10 includes a processor 12 which controls the operation of a print engine 14 (e.g., a laser print engine) via bus 16. A random access memory (RAM) 18 includes a pixel conversion procedure 20 which controls the operation of processor 12 during a conversion of a grey level pixel image into a binary level pixel image. The grey level pixel image is stored in a RAM 22 and comprises a plurality of pixels 24, arranged in a raster format, each one of which is represented by a multi-bit value that defines the respective grey level. In the example to be described hereinbelow, each pixel is assumed to be represented by an 8-bit byte.

A resultant binary level pixel image is stored in a RAM 26 in such a form that each pixel 28 is represented by either a 1 or a 0. Print engine 14 responds to a 0, for example, by not printing a dot and further responds to a 1 by printing a dot at pixel locations on a sheet of media that correspond to the pixel locations in RAM 26. During conversion of the grey level image contained in RAM 22 to the binary level image contained in RAM 26, each grey level pixel value is subjected to a dither procedure in dither module 30 which, in turn, outputs to RAM 26 a corresponding 1 or 0 value for the respective pixel. The operation of dither module 30 is controlled by processor 12 which is, in turn, controlled by pixel conversion 20. Hereafter, the operation of the invention will be described in the context of a hardware implementation of dither module 30. However it is to be understood that the invention can also be carried out by processor 12, under control of a dither procedure contained on media disk 31 or loaded into an appropriate area of RAM 20.

Prior to providing a detailed explanation of the operation of dither module 30 and the circuitry contained therein, the overall operation of the dither procedure will be briefly considered. The dither procedure employed to diffuse error values along each raster scan line utilizes, as a portion thereof, the blue noise dither procedure described above. However, a critical difference between the prior art blue noise dither procedure and that performed by dither module 30 is that the seed value that is employed to control a random counter which, in turn, outputs the variable threshold value against which each grey level pixel value is compared, is, itself, a random value which changes for each succeeding scan line (over a preset range of scan lines). More specifically, a seed value is generated by a pseudo-random counter for each scan line. That seed value controls the beginning count of a further pseudo random counter which outputs a pseudo-random threshold value for each pixel position in RAM 22. The grey level pixel value at each particular pixel position (e.g., pixel position "Ii") is compared against the variable threshold and an error value is developed that is either positive or negative, depending upon whether the grey value of pixel Ii is equal to greater than, or lesser than the variable threshold value for the respective pixel. If the grey level pixel value is equal to or exceeds the threshold value, a "1" binary value is output which is fed to RAM 26 and stored in a corresponding pixel position Pi. By contrast, if a grey level pixel value is less than the threshold value, a "0" binary value is passed to RAM 26 for storage in pixel position Pi.

During the comparison action, an error value is derived as follows: if the grey level pixel value equals or exceeds the variable threshold value, the error value is the grey level pixel value less 256 (assuming an 8-bit grey value). If, by contrast, the grey level pixel value is less than the variable threshold value, then the error value is the incoming grey level pixel value. Such error value is propagated to the next pixel to the right (Ii+1) and is added to the grey value thereof, after which the summed values are compared against a further variable threshold, etc. The procedure ends at the end of the respective scan line where any remaining error value is discarded. At the beginning of a next scan line (line N+1), the procedure is repeated with the seed random counter providing a new start value for the random counter which generates the variable threshold values.

As is known to those skilled in the art, pseudo random counters provide a random count sequence up to a maximum number of counts, and then repeat the random count sequence for a next series of random counts, etc. Through use of the pseudo random seed count at the beginning of each scan line which, in turn, controls the generation of the variable threshold values, it is assured that propagating error terms will not line up on succeeding scan lines, avoiding streaks or other anomalies in the binary image that would otherwise result from aligned error values.

As will be further understood from the description below, if a grey level pixel value is within a preset percentage of either a full black value (e.g. 255) or a full white value (e.g. 0), the error value is set to zero and only the grey level pixel value is compared against the variable threshold value.

Figure 2:
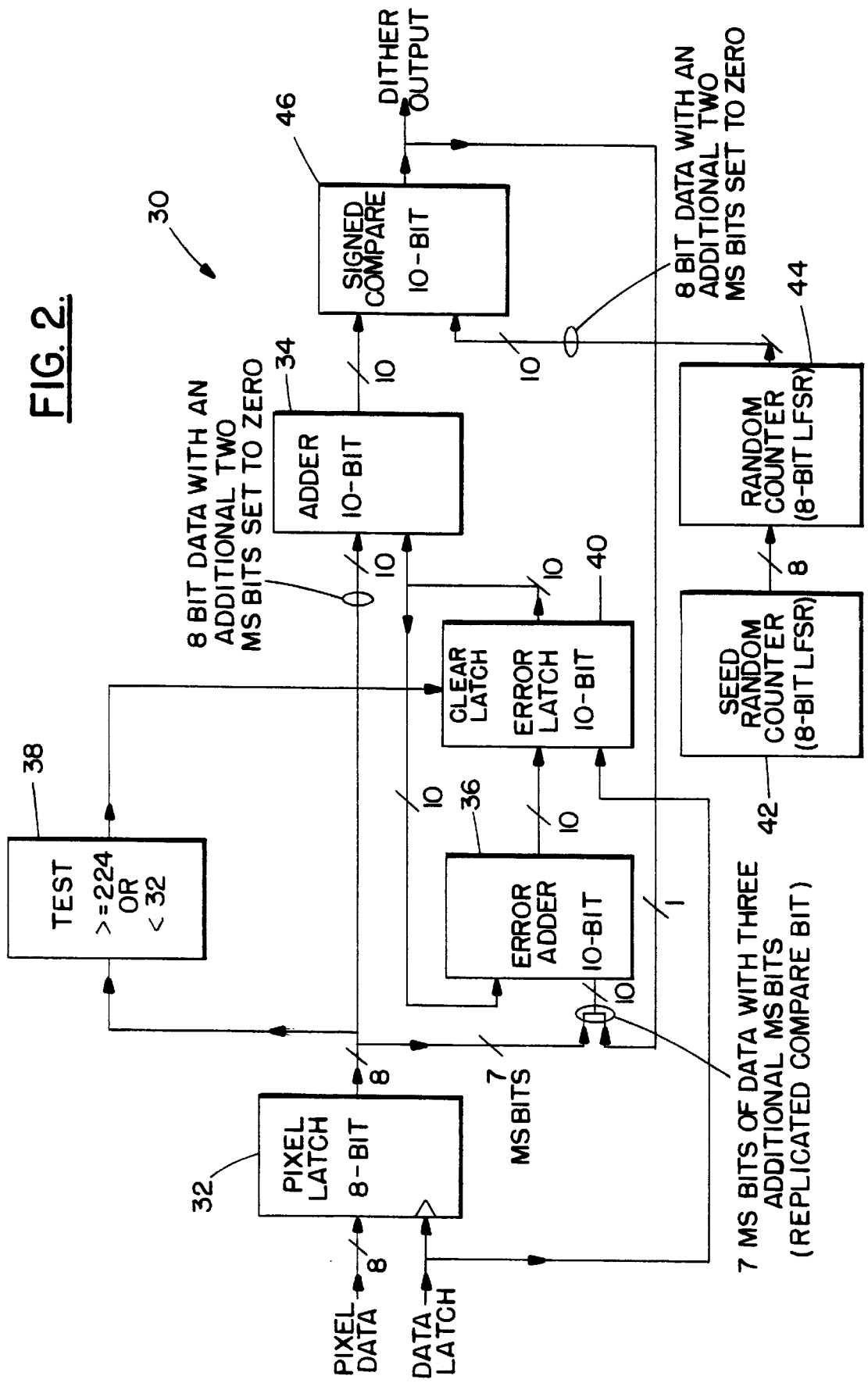
FIG. 2 is a further detailed block diagram of a dither module that implements the method of the invention.

Hereafter, the description of the operation of dither module 30 will be presented, as shown in FIG. 2. Dither module 30 comprises a pixel latch 32, to which is input grey level pixel data and a data latch signal. Outputs from pixel latch 32 are fed to an adder 34, an error adder 36 and a test module 38. The output from test module 38 is applied to an error latch 40 and clears the value therein if a grey level pixel value exceeds either upper or lower threshold values and prevents error values from dominating in the error diffusion operation.

The output of error adder 36 is fed to error latch 40 which in turn outputs its value to adder 34 wherein the propagated error value is added to a new grey level pixel value from pixel latch 32. A seed random counter 42 feeds a single random count at the beginning of each scan line to random counter 44. Random counter 44 commences its count from the seed random value and provides a variable threshold value output that is fed to signed compare module 46. The output from signed compare module 46 is either a one value or a zero value, depending upon the comparison between the variable threshold value output from random counter 44 and the output from adder 34.

The output from signed compare module 46 is the pixel value which is fed to RAM 26 (FIG. 1). The output from signed compare module 46 is also fed back to error adder 36 so as to enable a subtraction to occur in the event the output is a 1-bit (to be described in further detail below).

The pixel data coming from RAM 22 is a sequence of grey level pixel values. Pixel conversion procedure 20 acquires a single horizontal line of data from RAM 22, sequentially sends the data out to dither module 30, then steps to a next scan line. The pixel data is defined to be an 8-bit grey level value ($0-255_{10}$). In this example, 255 is defined to be black and 0 is defined to be white. (The hardware can invert the data so that white can be 0 or 255.)

Each of random counters 42 and 44 is implemented as an 8-bit linear feedback shift register (LFSR) that counts in a pseudo-random sequence that uses all of the possible numbers except zero ($1-255_{10}$). The counters can be constructed to use zero, but this requires additional gates.

Sections of the circuit of dither module 30 must be initialized at different times:

At the beginning of each page of printing, seed random counter 42 is initialized to a known starting value.

At the beginning of each scan line, the contents of seed random counter 42 are used to set the seed value of random counter 44. Seed random counter 42 is then incremented (goes to a new pseudo-random number). This assures that each new scan line starts with a pseudo-random number that is different from the previous line.

Random counters 42 and 44 are used to generate the pseudorandom values needed for the dithering process. By using two LFSR's instead of one larger LFSR, the pseudo-random numbers are independent of the left/right margins (number of pixels per line).

For each pixel in a scan line, the pixel grey level value is added to the previous error value, then a decision about placing a black dot is made by comparing this value to a random number. The result of this decision generates an error term that is be added to the previous error value.

The grey level pixel data is put on bus 16 and is applied to pixel latch 32. A data latch signal is strobed and latches the incoming pixel grey level value in pixel latch 32 and the error term from a previous pixel position is latched into error latch 40. If output value from pixel latch 32 meets the test in test module 38 (e.g., >=224 or <32), an output from test module 38 causes error latch 40 to be cleared. Otherwise, the value from pixel latch 32 is added to the value in error latch 40 by adder 34. The output from adder 34 is compared to a pseudo-random number from random counter 44 in signed compare module 46.

The dither output from signed compare module 46 is a single bit that is asserted if the output value from adder 34 is greater than or equal to the output value from random counter 44. If the dither output is not asserted (a white dot is to be placed), the error term is calculated by adding the current pixel value from pixel latch 32, divided by 2, to the previous error value from error latch 40. The division by 2 prevents the error term from being so great as to overcome the effect of the variable threshold value.

If the dither output from signed compare module 46 is asserted (a black dot is to be placed), the error term is calculated by subtracting (128 minus (the current pixel data value from pixel latch 32 divided by 2)) from the previous error value from error latch 40. Since the pixel data is divided by 2, the maximum error value that can be added per pixel is $127_{10}$. The error keeps getting larger until a black dot is printed (dither output is asserted), then $128_{10}$ is subtracted from the error.

Since the error can be >255 and can be positive or negative, a ten bit signed error is needed. The division and addition/subtraction is done by error adder 36: division by 2 is accomplished by only connecting the upper 7 bits of data to the 7 lowest significant bits of the input; the addition is due to the function of adder 36, and the subtraction is due to the use of the dither output bit (from signed compare module 46) to fill in the remaining 3 most significant bits above the 7 bit pixel data. The key is that subtracting $128_{10}$ is the same as adding in a 2's complement of 00 1000 $0000_2$ ($128_{10}$) which is 11 1000 $0000_2$. Since the upper three bits are '1's and the lower 7 bits are '0', adding this number to any 7 bit value will result in the upper three bits still being '1's and the lower 7 bits being the original 7 bits: and no logic gates are needed.

The error term dominates the output for sequences of very large or very small values of pixel data. This causes streaks in the output when the dots tend to line up. To remove these artifacts, error latch 40 is cleared when the input is below $32_{10}$ or equal to or above $224_{10}$.

A black dot should be placed when the output of signed compare module 46 is active, and a white dot should be placed when the output is inactive.

Table 1 below illustrates an example of constant grey value pixel inputs of 127 (solid grey data) to dither module 30.

TABLE 1

| Pixel Number | PIXEL LATCH | ERROR ADDER 36 | | | ERROR LATCH 40 | ADDER 34 | RANDOM COUNTER 44 | SIGNED COMPARE 46 |
|---|---|---|---|---|---|---|---|---|
| | | IN A | IN B | OUT | | | | |
|  | 127 | 0 | 63 | 63 | 0 | 127 | 133 | 0 |
| 1 | 127 | 63 | 63 | 126 | 63 | 190 | 221 | 0 |
| 2 | 127 | 126 | −65 | 61 | 126 | 253 | 55 | 1 |
| 3 | 127 | 61 | −65 | −4 | 61 | 188 | 2 | 1 |
| 4 | 127 | −4 | 63 | 59 | −4 | 123 | 195 | 0 |
| 5 | 127 | 59 | −65 | −6 | 59 | 186 | 170 | 1 |
| 6 | 127 | −6 | −65 | −71 | −6 | 121 | 22 | 1 |
| 7 | 127 | −71 | 63 | −8 | −71 | 56 | 110 | 0 |
| 8 | 127 | −8 | 63 | 55 | −8 | 119 | 203 | 0 |
| 9 | 127 | 55 | −65 | −10 | 55 | 182 | 88 | 1 |
| 10 | 127 | −10 | −65 | −75 | −10 | 117 | 68 | 1 |
| 11 | 127 | −75 | 63 | −12 | −75 | 52 | 155 | 0 |
| 12 | 127 | −12 | −65 | −77 | −12 | 115 | 28 | 1 |
| 13 | 127 | −77 | 63 | −14 | −77 | 50 | 202 | 0 |
| 14 | 127 | −14 | 63 | 49 | −14 | 113 | 164 | 0 |
| 15 | 127 | 49 | 63 | 112 | 49 | 176 | 226 | 0 |
| 16 | 127 | 112 | −65 | 47 | 112 | 239 | 153 | 1 |
| 17 | 127 | 47 | −65 | −18 | 47 | 174 | 92 | 1 |
| 18 | 127 | −18 | 63 | 45 | −18 | 109 | 251 | 0 |
| 19 | 127 | 45 | −65 | −20 | 45 | 172 | 63 | 1 |
| 20 | 127 | −20 | −65 | −85 | −20 | 107 | 55 | 1 |

Before pixel number 1 comes in, error latch 40 is cleared. Pixel latch 32 contains the last pixel transferred ($127_{10}$). When pixel number 1 is latched into pixel latch 32, error latch 40 is updated from error adder 36 which calculates: 0 (previous error value)+63 (previous pixel data/2)=63 (addition since the previous pixel did not assert the dither output). Adder 34 adds the output from pixel latch 32 to the output from error latch 40 and comes up with 127 (current pixel data)+63 (current error)=190. This is compared to the output from random counter 44 which now has a count of, for example, of 221. Signed compare module 46 determines that 190<221, so the dither output is not asserted (i.e,. puts out a white dot).

When pixel number 2 is latched into pixel latch 32, error latch 40 is updated from error adder 36 which calculates: 63 (previous error value)+63 (previous pixel data/2)=126 (addition since the previous pixel did not assert the dither output). Adder 34 adds the output from pixel latch 32 to the output from error latch 40 and comes up with 127 (pixel value)+126 (current error) =253. This is compared to the output from random counter 44 which now has a count, for example, of 55. Signed compare module 46 determines that 253>=55, so the output is asserted (i.e., puts out a black dot.)

When pixel number 3 is latched into pixel latch 32, error latch 40 is updated from error adder 36 which calculates: 126 (previous error value)—(128-63 (previous pixel data/ 2))=61. A subtraction of (128-previous pixel) is performed since the previous pixel asserted the dither output. Adder 34 adds the output from pixel latch 32 to the output from error latch 40 and comes up with 127 (pixel value)+61 (current error)=188. This is compared to the output from random counter 44 which now has a count, for example of 2. Signed compare module 46 determines that 188>=2, so the output is asserted (puts out a black dot). Thereafter the procedure continues until all of the grey value pixels have been subjected to the dither operation an binary image values have been inserted into RAM 28.

It should be understood that the foregoing description is only illustrative of the invention. Various alternatives and modifications can be devised by those skilled in the art without departing from the invention. For instance, while the invention has been described in the context of a printer, it can also be implemented in a scanner, copier or other similar apparatus which converts grey level images to binary pixel images. Further, while the term "grey" has been used, it is to be understood that the multi-bit image pixel values can also be an indicator of a color component. Accordingly, the present invention is intended to embrace all such alternatives, modifications and variances which fall within the scope of the appended claims.

What is claimed is:

1. A method for converting an image of multibat grey level pixel values into an image of binary pixel values, wherein each image is arranged in a multi-row raster scan format, wherein said method comprises, for each of a plurality of N rows of grey level pixel values of said image, the steps of:

a) deriving an error value for a pixel position in a row by calculating a difference between a variable threshold value and a grey level pixel value at said pixel position;

b) (i) combining said error value with a grey level pixel value in a next-to-occur pixel position in said row, to create an error diffused grey level pixel value therefor, and (ii) deriving a further error value by calculating a difference between said error diffused grey level pixel value and a variable threshold value;

c) positioning a first binary level in said next-to-occur pixel position if said further error value is less than said variable threshold value;

d) positioning a second binary level in said next-to-occur pixel position if said further error value is equal to or greater than said variable threshold value; and e) for each of one of said plurality of rows of grey level pixel values, deriving a random seed value for each row and employing said random seed value to control generation of said variable threshold value, based upon a further random value, at each said pixel position of said row.

2. The method as recited in claim 1, wherein step b) combines said error value with only said grey level pixel value in said next-to-occur pixel position in said row.

3. The method as recited in claim 1, wherein said random value derived in step e) is pseudo random and repeats after said plurality of N rows of grey level pixel values of said image.

4. The method as recited in claim 1, wherein step b)(i) is inhibited if said grey level pixel value in said next-to-occur pixel position in said row is either greater than a preset upper grey level value or is less than a preset lower grey level value, in which case said error diffused grey level pixel value becomes equal to said grey level pixel value of said next-to-occur pixel position in step b)(ii).

5. The method as recited in claim 1, wherein any error value calculated for a last grey level pixel value in a row is not propagated to a pixel position in a next row.

6. Apparatus for converting an image of multibit grey level pixel values into an image of binary pixel values, wherein each image is arranged in a multi-row raster scan format, wherein said apparatus comprises:

counter mean for deriving a different random seed value for use with each one of a plurality of N rows of grey level pixel values of said image, and employing the random seed value derived for a row to further generate a variable threshold value, based upon a further random value, for each said pixel position of said row adder means for deriving an error value for a pixel position in a row by calculating a difference between a variable threshold value generated for said pixel position and a grey level pixel value at said pixel position, said adder means next combining said error value with a grey level pixel value of a next-to-occur pixel position in said row, to create an error diffused grey level pixel value therefor;

compare means coupled to said adder means for deriving a further error value by calculating a difference between said error diffused grey level pixel value and variable threshold value generated for said next-to-occur pixel position, said compare means outputting a first binary level for said next-to-occur pixel position if said further error value is less than said variable threshold value, or a second binary level for said next-to-occur pixel position if said further error value is equal to or greater than said variable threshold value.

7. The apparatus as recited in claim 6, wherein said random value derived by said counter means is pseudo random and repeats after said plurality of N rows of grey level pixel values of said image.

8. The apparatus as recited in claim 6, wherein said counter means comprises a first linear feedback shift register (LFSR) which generates a new random number output at the beginning of processing of each row and a second LFSR which receives said new random number output at the beginning of processing of each row and employs said new random number to assure that a different sequence of variable threshold values is generated for each row of said N rows of said image.

9. The apparatus as recited in claim 6, further comprising:

test means responsive to said pixel grey level value of said next-to-occur pixel position in said row being either greater than a preset upper grey level value or less than a preset lower grey level value, to inhibit said adder means from combining said error value with said grey level pixel value of said next-to-occur pixel position in said row, so that said error diffused grey level pixel value becomes equal to said grey level pixel value of said next-to-occur pixel position.

10. The apparatus as recited in claim 6, wherein any error value calculated by said compare means for a last grey level pixel value in a row is inhibited from propagation to said adder means for combination with a pixel position in a next row.

11. A memory media for controlling a processor to convert an image of multibit grey level pixel values into an image of binary pixel values, wherein each image is arranged in a multi-row raster scan format, wherein said memory media comprises:

a) means for controlling said processor to derive a different random seed value for use with each one of a plurality of N rows of grey level pixel values of said image, and to employ the random seed value derived for a row to generate a variable threshold value, based upon a further random value, for each said pixel position of said row;

b) means for controlling said processor to derive an error value for a pixel position in said row by calculating a difference between a variable threshold value generated for said pixel position and a grey level pixel value at said pixel position, said processor next controlled to combine said error value with a grey level pixel value of a next-to-occur pixel position in said row, to create an error diffused grey level pixel value therefor; and c) means for controlling said processor to derive a further error value by calculating a difference between said error diffused grey level pixel value and variable threshold value generated for said next-to-occur pixel position, said processor further controlled by said means c) to output a first binary level for said next-to-occur pixel position if said further error value is less than said variable threshold value, or a second binary level for said next-to-occur pixel position if said further error value is equal to or greater than said variable threshold value.

12. The memory media as recited in claim 11, wherein said random value derived by said processor is pseudo random and repeats after said plurality of N rows of grey level pixel values of said image.

13. The memory media as recited in claim 11, further comprising:

d) means for controlling said processor to respond to said pixel grey level value of said next-to-occur pixel position in said row being either greater than a preset upper grey level value or less than a preset lower grey level value, to inhibit said means b) from controlling said processor to combine said error value with said grey level pixel value of said next-to-occur pixel position in said row, so that said error diffused grey level pixel value becomes equal to said grey level pixel value of said next-to-occur pixel position.

14. The memory media as recited in claim 11, wherein any error value calculated by said processor under control of said means c) for a last grey level pixel value in a row is inhibited from use by said means b) for combination with a pixel position in a next row.

* * * * *